(12) United States Patent
Liu et al.

(10) Patent No.: US 9,527,732 B2
(45) Date of Patent: Dec. 27, 2016

(54) METHODS AND DEVICES FOR CORRECTING ERRORS IN ATOMIC FORCE MICROSCOPY

(75) Inventors: Huiwen Liu, Eden Prairie, MN (US); Peter Gunderson, Ellsworth, WI (US); Lin Zhou, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 891 days.

(21) Appl. No.: 13/190,643

(22) Filed: Jul. 26, 2011

(65) Prior Publication Data

US 2012/0079635 A1 Mar. 29, 2012

Related U.S. Application Data

(60) Provisional application No. 61/385,618, filed on Sep. 23, 2010.

(51) Int. Cl.
*G01Q 10/06* (2010.01)
*B82Y 35/00* (2011.01)
*G01Q 30/06* (2010.01)

(52) U.S. Cl.
CPC .............. *B82Y 35/00* (2013.01); *G01Q 10/06* (2013.01); *G01Q 30/06* (2013.01)

(58) Field of Classification Search
USPC .......................................................... 850/1, 4
See application file for complete search history.

(56) References Cited

U.S. PATENT DOCUMENTS

| | | | | |
|---|---|---|---|---|
| 4,933,552 A | * | 6/1990 | Lee | 850/9 |
| 4,945,235 A | * | 7/1990 | Nishioka et al. | 850/3 |
| 5,051,646 A | * | 9/1991 | Elings et al. | 850/1 |
| 5,066,858 A | * | 11/1991 | Elings et al. | 850/26 |
| 5,107,113 A | * | 4/1992 | Robinson | 850/1 |
| 5,198,715 A | * | 3/1993 | Elings et al. | 850/21 |
| 5,204,531 A | * | 4/1993 | Elings et al. | 850/1 |
| 5,306,919 A | * | 4/1994 | Elings et al. | 850/18 |
| 5,308,974 A | * | 5/1994 | Elings et al. | 850/3 |
| 5,400,647 A | * | 3/1995 | Elings | 850/33 |
| 5,553,487 A | * | 9/1996 | Elings | 850/40 |
| 5,898,106 A | | 4/1999 | Babcock et al. | |
| 6,201,227 B1 | * | 3/2001 | Tomita | 250/201.3 |
| RE37,203 E | * | 6/2001 | Elings et al. | 250/307 |
| 6,265,718 B1 | * | 7/2001 | Park et al. | 850/10 |
| RE37,560 E | * | 2/2002 | Elings | 250/306 |
| 7,472,585 B2 | * | 1/2009 | Abramovitch | 73/105 |
| 7,555,941 B2 | | 7/2009 | Hansma et al. | |
| 7,631,547 B2 | * | 12/2009 | Yoshimatsu et al. | 850/1 |
| 7,690,047 B2 | * | 3/2010 | Yasuda et al. | 850/54 |
| 2008/0156988 A1 | * | 7/2008 | Umemoto et al. | 250/307 |
| 2008/0276696 A1 | | 11/2008 | Zhou et al. | |
| 2009/0230320 A1 | * | 9/2009 | Kusaka et al. | 850/18 |
| 2010/0117565 A1 | | 5/2010 | Moloni | |

* cited by examiner

*Primary Examiner* — Brooke Purinton

(74) *Attorney, Agent, or Firm* — Faegre Baker Daniels LLP

(57) ABSTRACT

In certain embodiments, a probe scans a surface to produce a first scan. The first scan is used to estimate a vertical offset for scanning the surface to produce a second scan. In certain embodiments, an AFM device engages a probe to a surface using a piezo voltage. The probe scans the surface to produce a first scan. The first scan is used to estimate a vertical offset such that the probe uses the piezo voltage to engage the surface for a second scan at a different vertical position.

17 Claims, 4 Drawing Sheets

METHODS AND DEVICES FOR CORRECTING ERRORS IN ATOMIC FORCE MICROSCOPY

RELATED APPLICATIONS

The present application is related to U.S. provisional patent application Ser. No. 61/385,618 filed on Sep. 23, 2010, entitled "METHOD AND APPARATUS FOR ATOMIC FORCE MICROSCOPY" from which priority is claimed under 35 U.S.C. §119(e) and which application is incorporated by reference herein in its entirety.

BACKGROUND

The present application relates to atomic force microscopy (AFM). AFM may be used to measure and characterize surface features of semiconductor devices, magnetic recording devices, and microelectromechanical system (MEMS) devices, among others.

AFM systems can use tube scanners to scan surfaces. Tube scanners can include electrodes composed of piezoelectric materials, which cause linearity and hysteresis errors. The linearity and hysteresis errors can vary when applying different voltages to the piezoelectric materials, thereby causing inaccuracies in the measurement and characterization of surface features.

SUMMARY

In certain embodiments, a probe scans a surface to produce a first scan. The first scan is used to estimate a vertical offset for scanning the surface to produce a second scan. In certain embodiments, an AFM device engages a probe to a surface using a piezo voltage. The probe scans the surface to produce a first scan. The first scan is used to estimate a vertical offset such that the probe uses the piezo voltage to engage the surface for a second scan at the same separation distance between AFM tip and sample surface.

DETAILED DESCRIPTION

Figure 1:
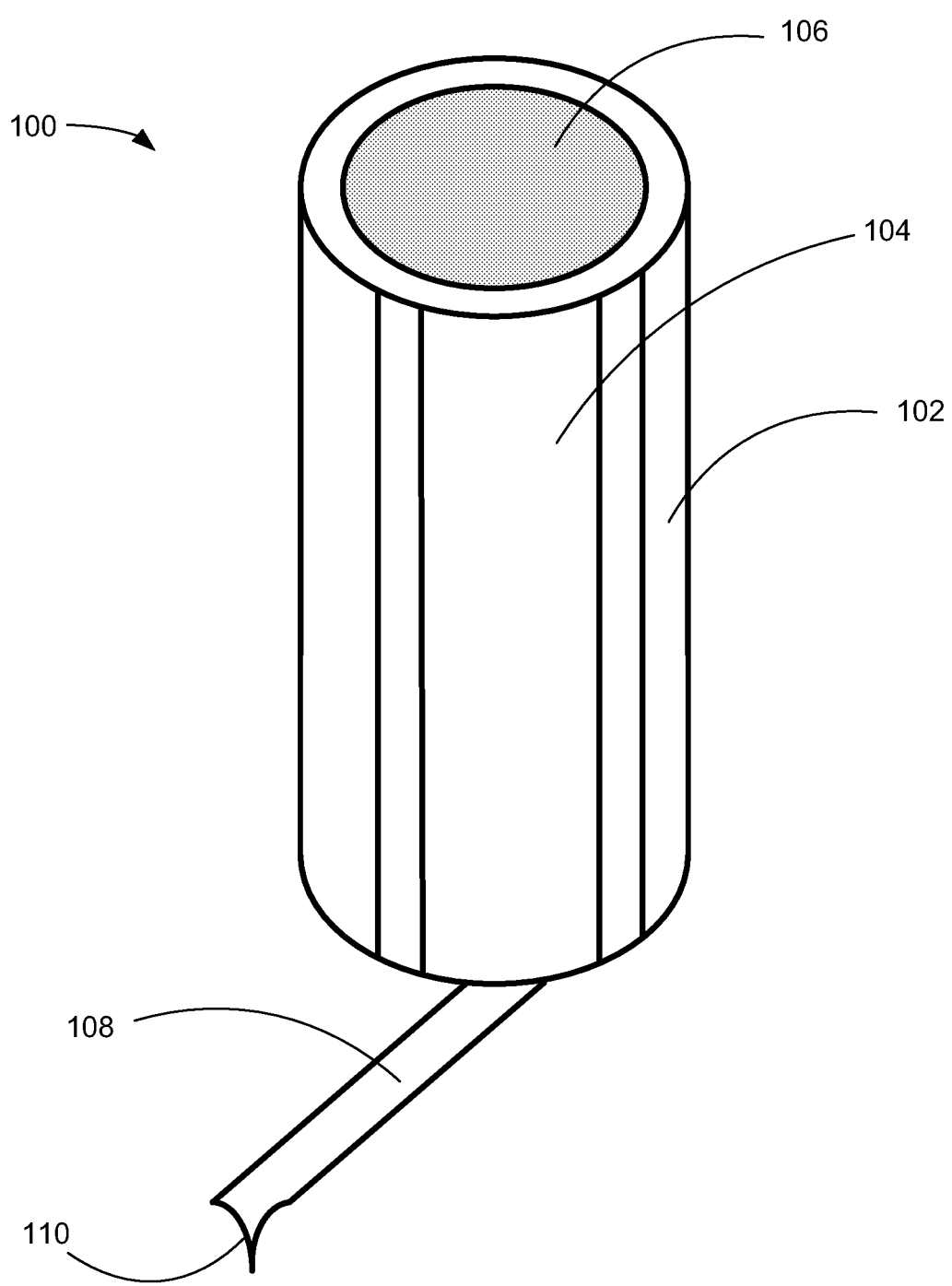
FIG. 1 depicts an exemplary tube scanner.

FIG. 1 shows parts of an AFM system, including a tube scanner 100 that includes a first electrode 102, a second electrode 104, a third electrode 106, and a probe 108, which is located on a distal end of the tube scanner 100. The probe has a probe tip 110.

The first electrode 102 and second electrode 104 control the tube scanner's horizontal motion while the third electrode 106 controls the tube scanner's vertical motion. Each electrode 102, 104, and 106 can be made of piezoelectric materials. When a voltage is applied to the first electrode 102 or the second electrode 104, the tube scanner 100 bends, thereby causing horizontal displacement. When a voltage is applied to the third electrode 106, the tube scanner 100 elongates, thereby causing vertical displacement. Altering the applied voltage alters an electrode's displacement, for example, increasing the applied voltage increases displacement.

For each applied voltage, piezoelectric materials naturally have associated linearity and hysteresis errors. As a result, tube scanner linearity and hysteresis errors differ among different elongation states. These differences in errors can cause inaccuracies when measuring and characterizing surface features and when using scan correction methods like image subtraction.

Figure 2:
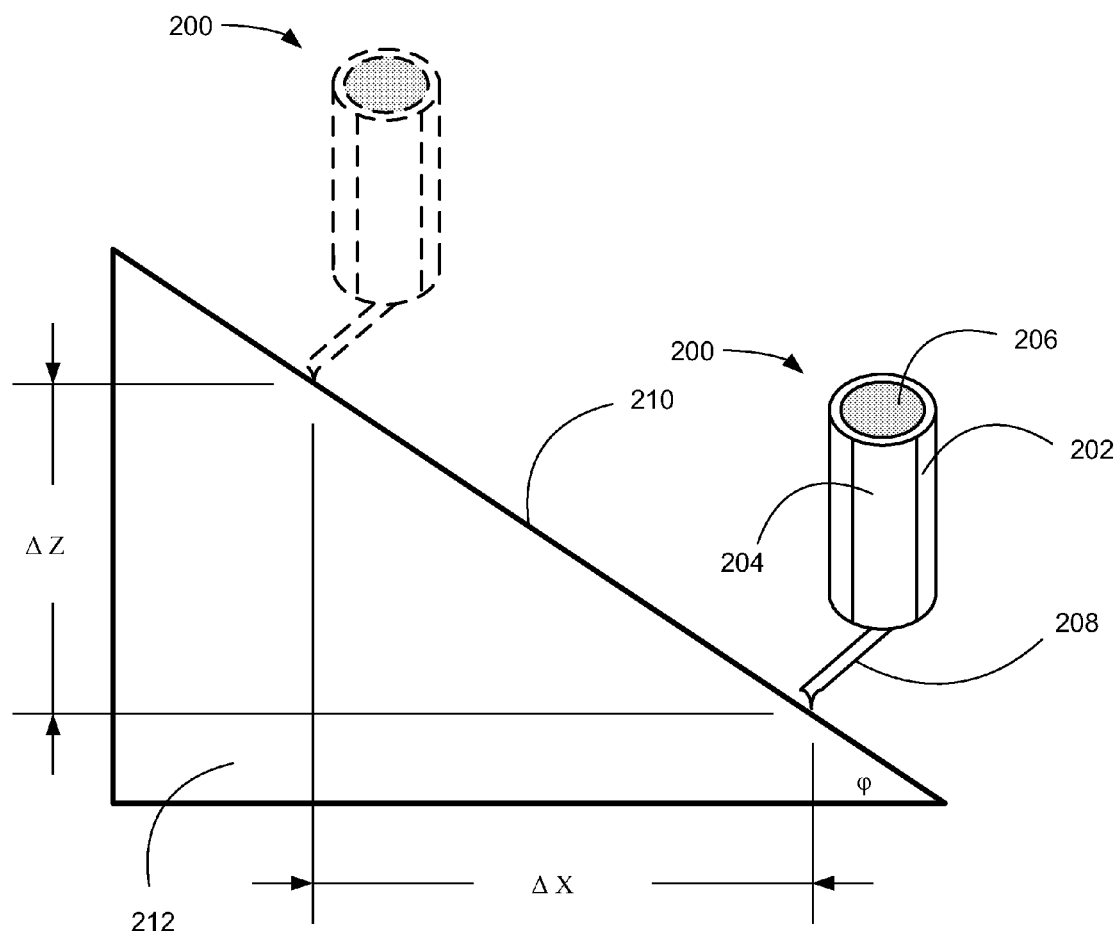
FIG. 2 provides an exemplary operation of an AFM device in accordance with various embodiments of the present invention.
Figure 3:
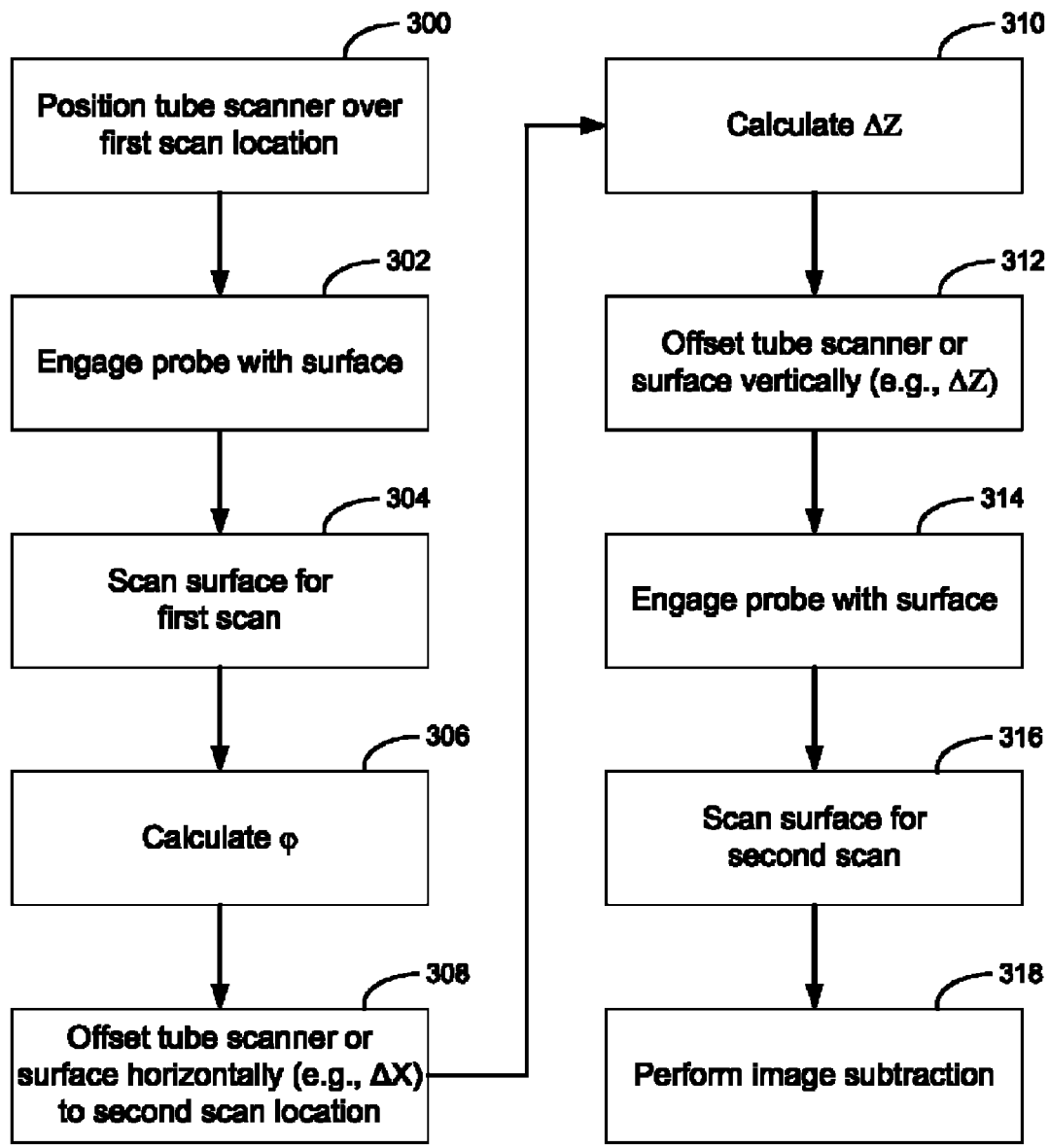
FIG. 3 provides an AFM device routine illustrative of steps carried out in accordance with various embodiments.

FIG. 2 shows parts of an AFM systems, including a tube scanner 200 including a first and second electrode 202 and 204 (for horizontal displacement), a third electrode 206 (for vertical displacement), and a probe 208. The probe 208 is shown engaged with a sample surface 210 of a workpiece 212 at a first scan location (tube scanner outlined in dotted lines) and at a second scan location (tube scanner outlined in solid lines). In use, as outlined in FIG. 3, the tube scanner 200 and the sample surface 210 can be moved in a horizontal or vertical direction by a step motor or other suitable devices to position the tube scanner 200 over a first scan location (step 300). The tube scanner 200 engages the probe 208 with the surface 210 by applying a voltage to the third electrode 206, thereby elongating the tube scanner 200 (step 302). Once engaged, the probe 208 scans the surface 210 and produces a first scan (step 304). The first scan produces an image of the surface 210 and can contain information like a surface tilt φ (step 306).

Then, the tube scanner 200 can be offset in a horizontal direction (e.g., $\Delta X$) to a second location for a second scan (step 308). Using the horizontal offset and the surface tilt φ from the first scan, the tube scanner 200 is offset in a vertical direction (e.g., $\Delta Z$) by using a step motor or other suitable method but not using the third electrode 206 so that the tube scanner 200 is substantially the same distance away from the surface 210 as during the first scan (steps 310 and 312). Alternatively, the sample surface 210, by itself or in combination with the tube scanner 200, may be offset in the horizontal and vertical directions. In one example, the vertical offset $\Delta Z$ is calculated using the following equation:

$$\Delta Z = \Delta X \times \tan(\varphi) \quad \text{(Equation 1)}$$

After vertically offsetting the tube scanner 200 or sample surface 210, the third electrode 206 is elongated by applying substantially the same amount of voltage applied to the third electrode 206 in the first scan, thereby engaging the probe 208 with the surface 210 (step 314). This is because the same separation distance between AFM tip and sample surface was maintained by adjusting Z position using step motor or other suitable method at the second location. Applying substantially the same amount of voltage permits the probe 208 to perform a second scan, at a different vertical height or at a different elevation along the surface 210, with substantially the same tube scanner linearity and hysteresis errors (step 316). This, in turn, reduces the effect of having different linearity and hysteresis errors in the first and second scans because the hysteresis behavior is substantially the same for both scans. The second scan produces an image of the surface 210.

In some larger size scan, AFM images contain artificial tube scanner bow error, but these errors can be mitigated. After the first and second scans have been produced, an image subtraction method is performed to obtain an accurate image of the topography of the surface 210 (step 318). Image subtraction is generally performed to eliminate effects like bowing effects, which are artificial errors caused by run out variation during scans. A corrected image can be created by subtracting the first scan from the second scan.

Figure 4:
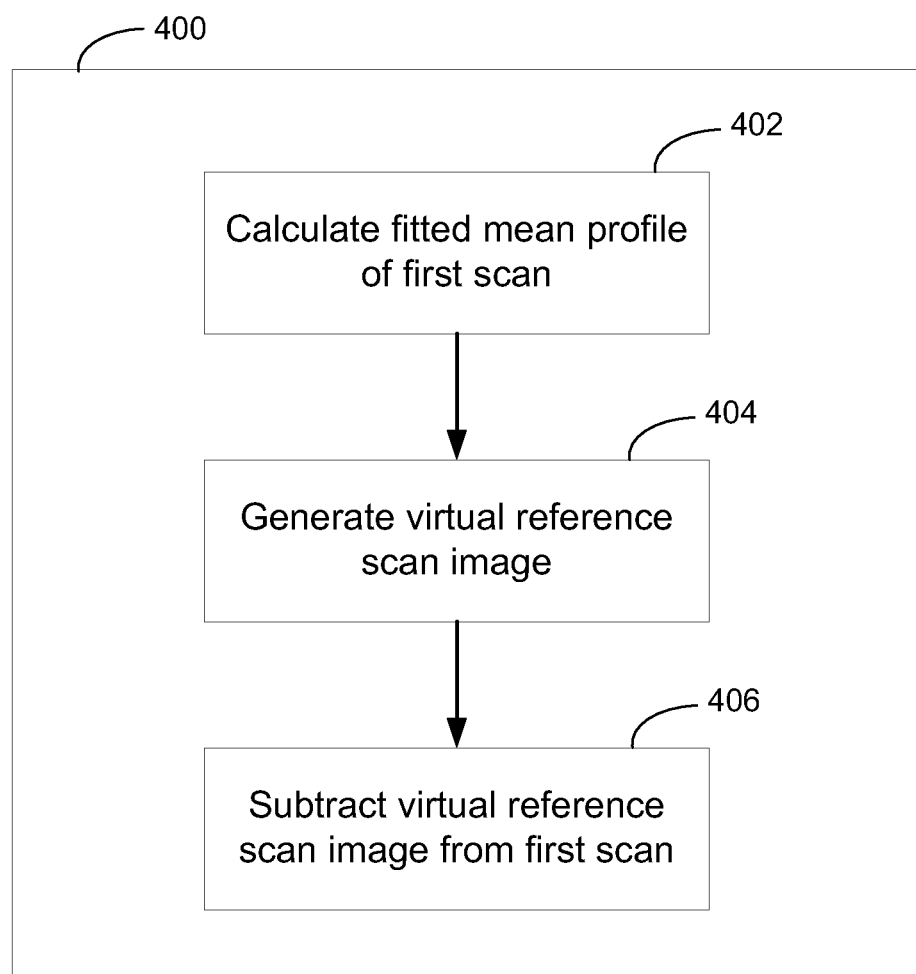
FIG. 4 provides an AFM device routine illustrative of steps carried out in accordance with various embodiments.

FIG. 4 outlines an alternative image subtraction method 400, which removes a second scan thereby avoiding the influence of linearity and hysteresis errors. Using the first scan, a fitted mean profile of the first scan is created (step 402). Using a flat and undamaged region of a first scan image, a fitted mean profile is created by a polynomial fit method (step 404). A virtual reference scan image is generated by replicating the polynomial fit to the same size of the first image or extrapolating the polynomial fit to cover the length scale of the first image. Finally, a corrected image can be created by subtracting the virtual reference scan image from the first scan (step 406). The virtual reference scan image method can be used for samples with limited surface area and therefore limited scanning area. Alternatively, the virtual reference scan can be used as a reference scan for additional scans, thereby reducing the number of reference scans needed, which improves throughput.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of steps within the principles of the present invention to the full extent indicated by the broad general meaning of the terms in which the appended claims are expressed.

What is claimed is:

1. A method comprising:
   applying a first voltage to a piezoelectric electrode on a tube scanner to vertically extend a probe tip towards a surface of a workpiece;
   scanning the surface to produce a first scan;
   offsetting the tube scanner in a horizontal direction; and
   based on the first scan and horizontal offset, estimating a vertical offset permitting the tube scanner to perform a second scan of the surface while applying the first voltage to the piezoelectric electrode.

2. The method of claim 1, further comprising:
   based on the vertical offset estimation, offsetting the tube scanner in a vertical direction; and
   scanning the surface to produce a second scan.

3. The method of claim 1, further comprising:
   based on the vertical offset estimation, offsetting the workpiece in a vertical direction; and
   scanning the surface to produce a second scan.

4. The method of claim 1, further comprising:
   based on the vertical offset estimation, offsetting both the workpiece and the tube scanner in a vertical direction; and
   scanning the surface to produce a second scan.

5. The method of claim 2, wherein the first scan comprises surface tilt information, and wherein the estimating step is further based on the surface tilt information.

6. The method of claim 2, wherein the second scan produces an image of the surface.

7. The method of claim 6, further comprising:
   subtracting the first scan from the second scan to produce a corrected image of the surface.

8. An apparatus comprising:
   an atomic force microscope (AFM) system including a tube scanner having an electrode and a probe attached to the electrode,
   wherein the AFM system is configured to:
     apply a first voltage to the electrode to vertically extend the probe towards a surface of a workpiece;
     scan the surface to produce a first scan;
     offset the tube scanner a horizontal distance; and
     based on the first scan and the horizontal distance, offset the tube scanner a vertical distance so that the probe can perform a second scan of the surface while the first voltage is applied to the electrode.

9. The apparatus of claim 8, wherein the electrode includes a piezoelectric material.

10. The apparatus of claim 8, wherein the first scan includes surface tilt information, and wherein the offsetting the tube scanner is further based on the surface tilt information.

11. The apparatus of claim 10, wherein the AFM system is configured to subtract the first scan from the second scan to produce a corrected image of the surface.

12. The apparatus of claim 8, wherein the AFM system is configured to estimate a vertical offset for scanning the surface to produce the second scan, based on the first scan and the horizontal distance.

13. The apparatus of claim 8, further comprising a step motor that offsets the tube scanner.

14. The apparatus of claim 8, wherein the AFM system is configured to apply the first voltage to the electrode to vertically move the probe to contact a surface of the workpiece.

15. A method comprising:
    scanning a surface at a first location with a scanner including a probe to produce a first scan containing surface tilt ($\phi$) information;
    moving the scanner a horizontal distance ($\Delta X$) to a second location; and
    based on the surface tilt information and the horizontal distance, moving the scanner a vertical distance ($\Delta Z$), wherein the vertical distance ($\Delta Z$) is calculated in accordance with a first equation:

$\Delta Z = \Delta X * \tan(\phi)$.

16. The method of claim 1, wherein the piezoelectric electrode elongates a first vertical distance when the first voltage is applied to the piezoelectric electrode to vertically extend the probe tip.

17. The apparatus of claim 8, wherein the electrode elongates a first vertical distance when the first voltage is applied to the electrode to vertically extend the probe.

* * * * *